United States Patent
Nerling

(10) Patent No.: US 11,225,008 B2
(45) Date of Patent: Jan. 18, 2022

(54) METHOD AND DEVICE FOR DETERMINING A LAYER PROPERTY OF A LAYER IN AN EXTRUSION PROCESS

(71) Applicant: INOEX GmbH, Melle (DE)

(72) Inventor: Christoph Nerling, Rinteln (DE)

(73) Assignee: INOEX GmbH, Melle (DE)

( * ) Notice: Subject to any disclaimer, the term of this patent is extended or adjusted under 35 U.S.C. 154(b) by 704 days.

(21) Appl. No.: 15/741,090

(22) PCT Filed: Jun. 24, 2016

(86) PCT No.: PCT/DE2016/100286
§ 371 (c)(1),
(2) Date: Dec. 29, 2017

(87) PCT Pub. No.: WO2017/000933
PCT Pub. Date: Jan. 5, 2017

(65) Prior Publication Data
US 2018/0194055 A1 Jul. 12, 2018

(30) Foreign Application Priority Data

Jul. 1, 2015 (DE) ..................... 10 2015 110 600.0

(51) Int. Cl.
*B29C 44/00* (2006.01)
*B29C 48/00* (2019.01)
(Continued)

(52) U.S. Cl.
CPC ............ *B29C 48/92* (2019.02); *B29C 44/507* (2016.11); *B29C 44/60* (2013.01);
(Continued)

(58) Field of Classification Search
CPC .......... B29C 48/92; B29C 2948/92504; B29C 2948/9258; B29C 2948/926;
(Continued)

(56) References Cited

U.S. PATENT DOCUMENTS 3,953,739 A 4/1976 Colombo et al.
4,244,897 A * 1/1981 Moon ..................... B29C 44/60
264/40.4

(Continued)

FOREIGN PATENT DOCUMENTS

DE 10 2008 026 484 A1 10/2009
EP 2 982 932 A1 2/2016

OTHER PUBLICATIONS

International Written Opinion along with the ISR, dated Oct. 18, 2016, in counterpart application No. PCT/DE2016/100286, filed Jun. 24, 2016 (12 pages).

(Continued)

*Primary Examiner* — Jacob T Minskey
*Assistant Examiner* — Matthew Hoover
(74) *Attorney, Agent, or Firm* — Shlesinger, Arkwright & Garvey LLP

(57) ABSTRACT

Method for determining at least one layer property of a layer to be determined, in particular a foam layer, in an extrusion process, where a supply material is at least partially foamed and an extrusion product with the foam layer is put out (in other words, is output). The method has at least the steps of irradiating the extrusion product using electro-magnetic radiation, and electro-magnetically measuring at least one radiation having travelled through the foam layer. Measuring at least one feed-in rate or feed-in volume of the supply material, and determining the at least one material property of the layer to be determined from the measured feed-in volume and the electro-magnetic measurement.

14 Claims, 2 Drawing Sheets

Figure 1:
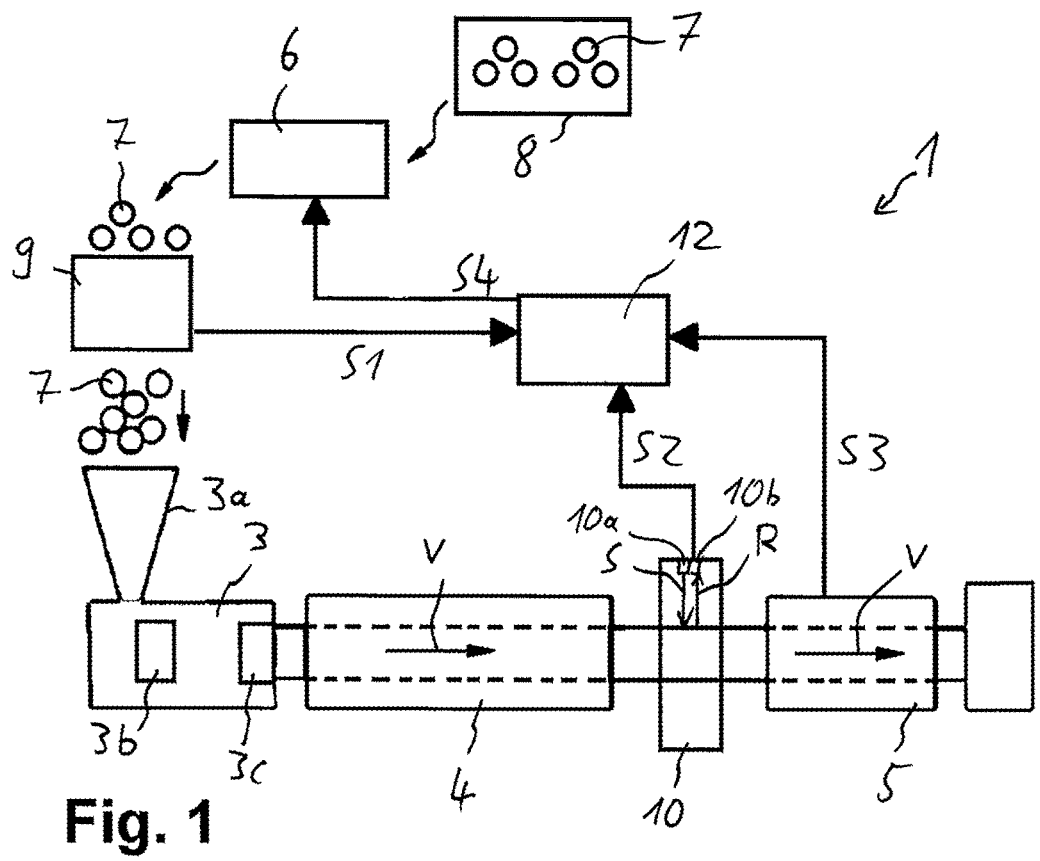

(51) Int. Cl.
*G05D 5/00* (2006.01)
*B29C 48/92* (2019.01)
*B29C 48/09* (2019.01)
*B29C 48/21* (2019.01)
*G05D 5/03* (2006.01)
*B29C 44/50* (2006.01)
*B29C 44/60* (2006.01)
*B29L 23/00* (2006.01)
*G01B 11/06* (2006.01)

(52) U.S. Cl.
CPC ........ *B29C 48/0012* (2019.02); *B29C 48/022* (2019.02); *B29C 48/09* (2019.02); *B29C 48/21* (2019.02); *G05D 5/03* (2013.01); B29C 2948/926 (2019.02); B29C 2948/92104 (2019.02); B29C 2948/92152 (2019.02); B29C 2948/92333 (2019.02); B29C 2948/92447 (2019.02); B29C 2948/92647 (2019.02); B29C 2948/92685 (2019.02); B29C 2948/92942 (2019.02); *B29L 2023/22* (2013.01); *G01B 11/06* (2013.01)

(58) Field of Classification Search
CPC ............... B29C 2948/92609–92657; B29C 2948/92685; B29C 44/00; B29C 44/50; B29C 44/507; B29C 44/60; B29C 48/00; B29C 48/02; B29C 48/022; B29C 48/001; B29C 48/0012; B29C 48/09; B29C 48/20; B29C 48/21; B29C 48/90; G05D 5/00; G05D 5/03
See application file for complete search history.

(56) References Cited

U.S. PATENT DOCUMENTS

| | | | |
|---|---|---|---|
| 4,329,052 | A | 5/1982 | Colombo et al. |
| 4,613,471 | A * | 9/1986 | Harris ............... B29C 44/60 264/40.1 |
| 5,338,765 | A | 8/1994 | Near et al. |
| 7,112,047 | B2 | 9/2006 | Schmuhl et al. |
| 7,223,089 | B2 | 5/2007 | Schmuhl et al. |
| 7,789,649 | B2 | 9/2010 | Dickhaus et al. |
| 9,791,263 | B2 | 10/2017 | Hochrein |
| 2011/0141540 | A1 | 6/2011 | Hochrein et al. |
| 2015/0008324 | A1 | 1/2015 | Itsuji |

OTHER PUBLICATIONS

German Office dated Mar. 4, 2016 in German Patent Application No. 10 2015 110 600.0, filed Jul. 1, 2015 (6 pages).
Hauck, D. et al., "Terahertz Inline Wall Thickness Monitoring System [ . . . ] Extrusion", in AIP Conference Proceedings 1593, 86 (2014) (5 pages).
International Search Report (ISR), dated Oct. 18, 2016, in counterpart application No. PCT/DE2016/100286, filed Jun. 24, 2016 (6 pages).

* cited by examiner

METHOD AND DEVICE FOR DETERMINING A LAYER PROPERTY OF A LAYER IN AN EXTRUSION PROCESS

The invention relates to a method for determining at least one layer property of a layer the properties of which are to be determined in an extrusion process. Hereby, in particular a layer property of a mixed layer, e.g. a foam layer of the extrusion product, in particular, an extruded pipe may be determined. Further, a method and a device for manufacturing the extrusion product are created.

In extrusion processes extrusion products are manufactured, in particular, also in an endless procedure, using a supply of plastics. As extrusion products, among other things, plastic pipes, profiles and sheets may be manufactured. Besides extrusion products consisting of a continuous plastics material, extrusion processes are known for manufacturing products consisting of mixtures of two or more substances; such mixtures may be, in particular, foams where a plastics material is foamed thereby creating a mixture of plastics and a gas. Thus, such products may be foamed in total or in part. A foam may be generated by means of physical foaming using a gas such as air or by means of chemical foaming.

Further mixtures are, e.g., fiber reinforced plastics like plastic reinforced by glass fibers, where glass fibers are embedded in a plastics matrix. Moreover, it is possible for several layers to be present which cannot or cannot be exactly separated when measuring, thereby presenting themselves in measurements as mixture or poorly separable combinations.

Thus, plastic pipes, profiles or sheets may be made in total or in individual layers from such a mixture.

Basically, such an extrusion process for manufacturing products with mixed layers is cost efficient. However, the creation of the at least one mixed layer depends on many parameters which may change even during an extrusion process.

Therefore, it is helpful to measure a layer to be determined, in particular, to determine a layer property of a mixed layer in the extrusion product in order to determine the properties of the plastics product.

For determining the wall thicknesses of pipes, ultrasound measurements are known. However, such measurements are difficult with a mixed layer, e.g. a foam layer, because the different components may e.g. be strongly reflective as well as well as attenuating and diffusing.

Furthermore, wall thickness measurements by means of Terahertz radiation are known. In general, however, foam layers are not measured using Terahertz radiation because the refraction index of the Terahertz radiation on the foam layer is undetermined. The foam layer is a mixture of air and plastics the composition and, therewith, the refraction index of which is unknown initially.

The document U.S. Pat. No. 4,613,471 B proposes a system and a method for adjusting the thickness of extruded foam products in which the amount of the molten mass fed to the extruder device is determined. Hereby, the pumping velocity and the cross sectional dimensions of the melted material can be determined. Subsequently, it is possible to determine the quotient of the foamed foam material in relation to the un-foamed foam material from the product of the density of the un-foamed smelter and the feeding volume (volume per unit of time) of the extruded foam material. Thus, it is possible to correct the fed-in amount in order to create a foam product with desired properties.

Thus, such a measuring method allows corrections to be made to the foamed extrusion product. However, it is generally laborious to measure the foamed material.

Die DE 10 2008 026 484 A1 relates to a method for generating two delayed pulses for a Terahertz spectroscopy where a pulsed beam is subsequently sub-divided, one of the partial beams is temporally delayed and subsequently both partial beams are guided towards a target area. Thereby, from the pulsed beam pulsed partial beams may be determined which can subsequently be used for a Terahertz measuring process, in particular, for taking run time measurements.

The present invention is based on the object of creating a method and a device for determining a layer property of a layer to be determined in an extrusion process allowing a secure and exact determination. Furthermore, an extrusion method and an extrusion device incorporating such a method shall be created.

This task is solved by a method according to claim 1. The sub-claims describe preferred further developments. Hereby, furthermore, a method and a device for manufacturing an extrusion product are created. Hereby, the device is provided, in particular, for carrying out the manufacturing method, and the method may be carried out using the device.

The invention is based on the idea to examine the extrusion product having the at least one layer to be determined, after having been manufactured, by means of an electromagnetic measuring procedure, in particular, a THz measuring procedure, in order to obtain measuring data relating to its wall properties or layer properties respectively. Hereby, it was found that, owing to the unknown electromagnetic properties of the layer to be determined, the electro-magnetic measurements are yet insufficient for an evaluation of the foam layer. Thus, in the case of totally or partially mixed, e.g. foamed, products, measuring data from a Terahertz measuring data are not yet sufficient for determining e.g. a layer thickness or wall thickness because the refraction index of a foamed material in the Terahertz measuring range depends on its material density. In case of other mixed substances, correspondingly, the respective portion of the substances is relevant.

Therefore, in addition to electro-magnetic measurements, measuring data or measuring signals from the material feed of the extrusion process, in particular, data or measuring signals relating to the in-fed amount of material are utilized. These measuring data or measuring signals are acquired during the extrusion process and may be obtained, in particular, gravimetrically and/or volumetrically. In case of the particularly advantageous gravimetric measurement, in particular, a weighing process may be utilized using a weighing device measuring the input rate in terms of mass per time. A volumetric measurement can be carried out e.g. by means of electro-magnetic measurement if a specific density of the fed-in material, e.g. a bulk material, is known. Further, a volumetric measurement can be carried out e.g. in the extruder during the feed of the molten material to the nozzle, e.g. from the measurement of a pressure difference at the ends of a feeder pipe provided that the viscosity of the smelter is known.

The electro-magnetic measurement ca be carried out, in particular, as Terahertz measurement, preferably in a frequency band from 0.01 THz to 50 THz, in particular between 0.05 to 20 THz, and in particular in the range from 0.1 THz to 10 THz. Preferably, the measurement is carried out utilizing reflection on boundary layers. Hereby, run-time measurements can be provided.

Further, measuring data or measuring signals may be obtained from the out-flow velocity of the extrusion line or the output of extruded product respectively.

According to a preferred embodiment a refraction index of the at least one mixed layer, e.g. foam layer, is determined which, on the one hand, may be used directly for describing the layer to be determined or, respectively, a mix ratio of the layer. Further, e.g. the foaming ratio of a foam layer can be determined from the refraction index of the layer to be determined.

The invention recognizes that, besides foams, e.g. the following other mixed layers or layers of mixtures may be determined: fiber reinforced plastics, e.g. glass fiber reinforced plastics, and carbon fiber reinforced plastics, in particular where the refraction index of the fiber material is known in principle. Further, it is also possible to determine e.g. layers hard to separate or to be differentiated in the electro-magnetic measurement, e.g. thin adjacent layers without exact separability in e.g. a THz measurement, as "mixed layers" with an average refraction index.

In addition to the layer properties of the layers to be determined the layer properties of further layers, in particular, continuous plastic layers may be determined.

Hereby, a continuous layer or continuous material is to be understood as a non-foamed layer or non-foamed material respectively.

According to further embodiments, geometric dimensions of the extrusion products, in particular pipes, profiles, sheets or hoses, for determining the wall properties, i.e., in particular, a refraction index or a layer thickness, can be used; in principle, such properties may also be estimated.

According to the invention it is further recognized that the data determined from the measuring process or the measuring device respectively are used directly in the extrusion so that the extrusion process can be regulated with an adjustment or correction of the fed-in amount of the at least one fed-in material as a function of the determination of the layer properties.

Thus, in particular, in line measurements or in situ measurements are also possible where the manufactured extrusion products are measured directly after the extrusion still in the manufacturing chain (in line), e.g. even prior to being severed or cut off. In particular, the extrusion products may also be measured in their full circumference. Depending on the measurement, subsequently, a regulation may be carried out involving a correction of the fed-in amount as correcting variable and/or adjustment of other manufacturing parameters.

This results in various advantages:

A direct in line measurement is possible, in particular, in a continuing measuring process. This allows measurements, which are faster and less complex and faster corrections compared e.g. to a later measurement of the weight or the mass respectively of an extrusion product, with a direct correction of the process parameters happening even during the extrusion process.

Moreover, the measurement is material-friendly, fast and can be carried out with little energy consumption.

In particular, the method and the device can be applied to various extrusion products which are foamed in total or in part. These are, in particular, one- or more-layered pipes, sheets, but also e.g. profiles and other extrusion products of essentially arbitrary shape.

Figure 2:
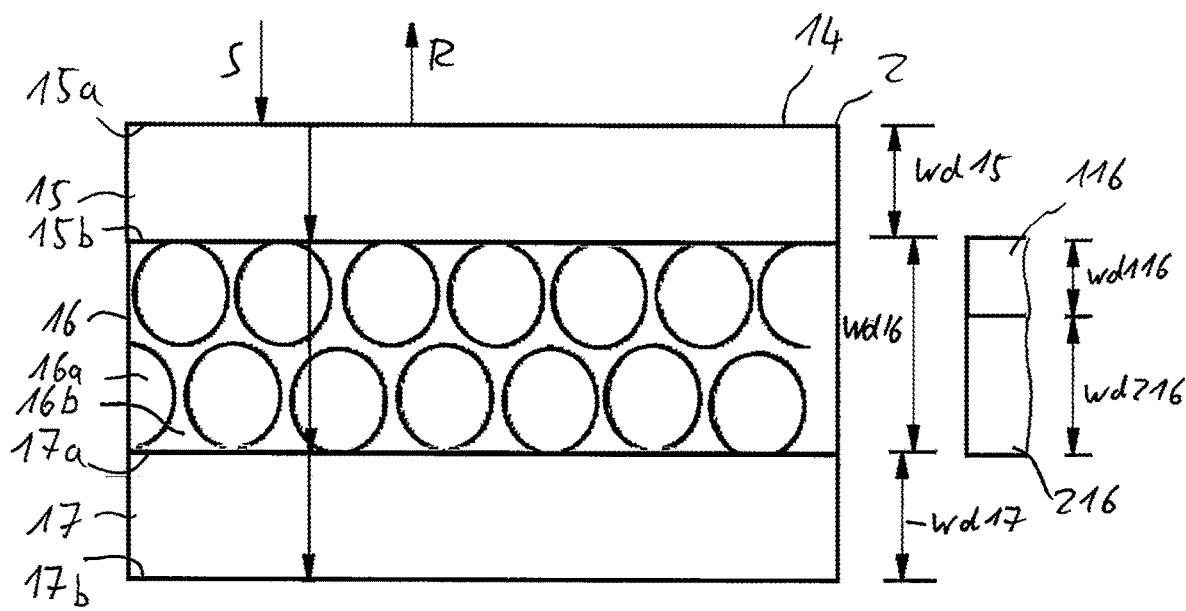
Figure 3:
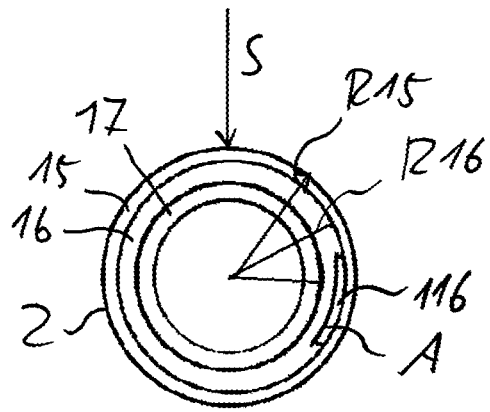
Figure 4:
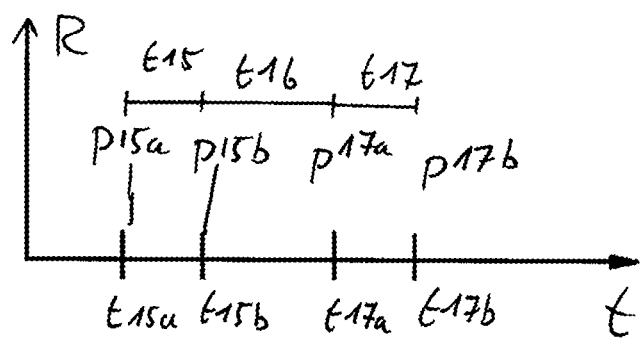
Figure 5:
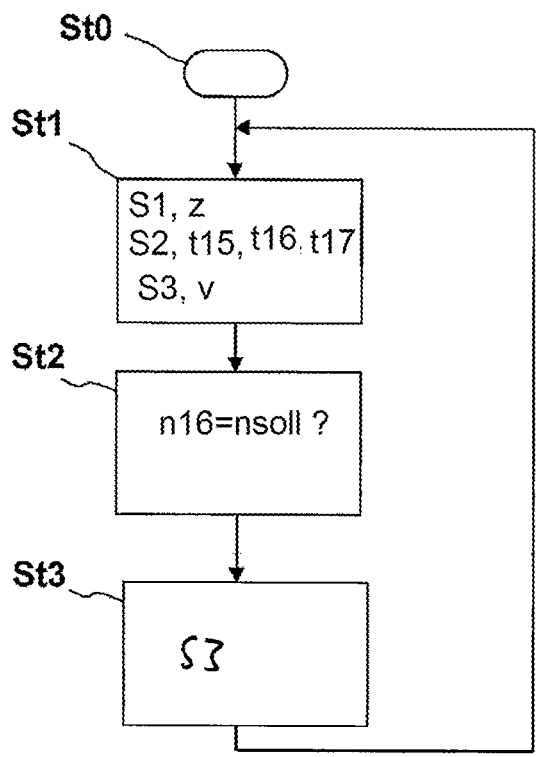

Subsequently, the invention will be further illustrated by means of the attached drawings in a few embodiment examples. Hereby, by way of example only, in particular, foam is described as a mixed material while e.g. other mixtures may also be examined similarly. It is shown in:

FIG. 1 an extrusion device for manufacturing a foam pipe with a measuring device according to an embodiment of the invention;

FIG. 2 the section through a multi-layer wall of an extrusion product with a middle foam layer;

FIG. 3 a section through a foam pipe with a middle foam layer;

FIG. 4 a diagram with a measuring signal;

FIG. 5 a flow chart of a procedure according to the invention.

According to FIG. 1, an extrusion device 1 for manufacturing extrusion products 2, in particular, in the case at hand, foam pipes 2, comprises an extruder 3, a cooling device 4 and an extractor and sawing device 5. Furthermore, the extrusion device comprises a conveyor device 6 extracting the supply material 7, e.g. synthetic granules, plastics powder or plastics pellets, from a reservoir 8 and conveying it via a scales device 9 to an input opening 3a, e.g. a funnel, of the extruder 3. The conveyor device 6 may be designed e.g. as adjustable input opening regulating a falling stream of the supply material 7 by means of a corresponding cross-section adjustment.

In a manner known as such the extruder 3 further comprises a feed zone, a smelting device 3b, as well as a nozzle 3c which puts out, in a manner known as such, the extrusion product, in this case as a foam pipe 2, from the molten supply material 7. In order to create e.g. a foam pipe 2 according to FIG. 3 having several concentric tubes the extruder 3 may be designed correspondingly more complex and/or having several nozzles 3c.

It is also possible to use a mixture of different supply materials, e.g. several granulates, as supply material 7. Foaming agents may be added to induce chemical foaming.

The scales device 9 determines the fee-in rate z or, respectively, the temporal feed-in amount as mass per time, i.e. in kg/s, and puts out a first measuring signal S1 to a controller 12. Thereafter, the supply material 7 is received by the extruder 1, molten and pressed out via its nozzle 3c as foam pipe 2, subsequently cooled in the cooler device 2, and correspondingly extracted or removed and cut into pieces by the extractor and sawing device 3.

Furthermore, the extruder device 1 comprises a Terahertz measuring device 10, which may basically be provided at any location downstream from the extruder 3, to measure the generated extrusion product 2. The Terahertz measuring device 10 emits Terahertz radiation S, receives reflected radiation R and, if appropriate, following a partial evaluation, puts out second measuring signals S2 to the controller 12. Hereby, the conveyed foam pipe 2 may be measured in its full circumference without rotating or shifting while still inside the extrusion device 1. The Terahertz measuring device 10 comprises a transmitter 10a and a receiver 10b which e.g. rotate around the extrusion product 2 in order to measure the full circumference thereof.

The extraction device 5 supplies a third a measuring signal S3 relating to an extraction velocity v of the extrusion product 2 to the controller 12. Moreover, the controller 12 puts out a volume adjustment signal S4 to the conveyer unit 6, in order to adjust the feed-in rate z e.g. by adjusting a feed cross-section or a spiral conveyor. Furthermore, the controller 12 may also receive measuring signals of the extruder 3, e.g. relating to temperature, or even a further velocity signal, e.g. of a melting pump, as a further measuring signal.

FIG. 2 shows a wall 14 of the extrusion product 2, e.g. a wall 14 of a foam pipe, shown in FIG. 3 as extrusion product. The wall 14 comprises an outer wall layer 15, a middle foam layer 16 and an inner wall layer 17. For clarity, in FIG. 2 the layers 15, 16, 17 are shown flat; FIG. 3 shows the embodiment of a foam pipe 2 in which these layers have correspondingly ring-shaped shapes.

According to FIG. 2, Terahertz radiation S emitted from the Terahertz measuring device 10 hits the layers 15, 16, 17, having refraction indexes n15, n16, n17, at a right angle from the outside. According to FIG. 3, in the case of a round foam pipe 2 the radiation S impacts radially distributed over the circumference. The radiation S is partially reflected at the boundary layers, where the refraction index n changes, always according to Snell's law. Thus, the radiation S is reflected towards the outside 15a and the inside 15b of the first layer 15, reflected at the inner boundary surface 15b corresponding to its change of refraction index from n15 to n16. In the middle foam layer 16 there is a refraction index n16 resulting from an averaging between the refraction index n0 of the air at n0=1 and n15=n17≈1.5. Thus, n16 lies between n0=1 and n15=n16≈1.5, depending on the material portion in the middle foam layer 16.

In FIG. 2 the middle foam layer 16 is shown schematically; in actual fact, there is a multiplicity of bubbles 16a or pore respectively with bridges 16b there between. Thus, the radiation S transits the foam layer 16 and is reflected again at the boundary layers 17a and 17b of the inner wall layer 17.

In case of a pure foam pipe comprising merely one foam layer 16, corresponding transitions of the foam layer 16 to the air are being measured.

FIG. 4 shows in a simplified form a measuring diagram as reflection signal of the reflected radiation R. The Terahertz radiation S is emitted by the transmitter in a pulsed form so that in the reflected radiation R a runtime measurement of the reflection peaks at the boundary surfaces is possible. Thus, according to FIG. 5, it is possible, when conducting the runtime measurement of a measuring pulse, to obtain e.g. a measuring signal with the four peaks p15a, p15b, p17a, p17b, corresponding to the boundary surfaces 15a, 15b, 17a, 17b.

For the subsequent calculation it must be taken into consideration that e.g. for the reflection at the boundary surface 15b the radiation S transits the layer thickness d15 of the outer layer 15 twice, i.e. from the first boundary surface 15a to 15b, and, after be reflected, back to 15a.

The wall thickness wd of a pipe, e.g. the wall thickness wd15 of the outer pipe 15, may be determined from the determined time difference t according to the following formula:

$$wd = \frac{t*c}{2*n} \quad (GL1)$$

where c=speed of light in a vacuum, n0=refraction index.

Thus, the wall thicknesses wd15 and wd17 of the through pipes 15 and 17 may be determined, with n=1.5.

For the middle foam layer 16, too, the following applies $$wd_{16} = \frac{t_{16}*c}{2*n_{16}}, \quad (GL2)$$

with unknown n16.

Hereby, the refraction index n16 is a characteristic value for identifying the foam layer 16 which is to be determined.

In order to determine the refraction index n16 of the foam layer 16 it is calculated as follows:

The foam layer 16 is first assumed as averaged value or "sum" of a—fictitious—plastics layer 116 with layer thickness wd116 and a—fictitious—air layer 216 with layer thickness wd216, as indicated in FIG. 2 on the right side. The following applies $$t_{16}=t_{116}+t_{216}$$

$$t_{216}=t_{16}-t_{116}t_{116}=2*wd_{116}*n_{116}/c \quad (GL3)$$

where n116=n15=n17=1.5 and
t16, t116, t216 runtimes in the layers 16, 116, 216.

Hereby, the layer thickness wd116 is determined via the feed-in rate z of the dimension mass per time or kg/s, determined as first measuring signal S1, and further the third measuring signal S3 of the extraction velocity v. Subsequently, firstly, a length mass Lg of the dimension mass per unit length, i.e. kg/m, may be determined, i.e. the length mass Lg is determined as quotient of the fee-in rate z and the extraction velocity v or, respectively, the foam pipe (extrusion product) 2, $$\text{i.e. } Lg=z/v. \quad (GL4)$$

The fictitious material layer 116 may be calculated e.g. from the—known—outer diameter R16 of the foam layer 16, i.e. the inner diameter of the outer tube 15. The entire pipe diameter D=2×R15, with R15 outer radius of the outer layer (outer tube) 15, is known; R15 may be determined e.g. optically by means of image capture of the extrusion product 2 or by knowledge of the exit opening of the nozzle 3c. Thus, from R15 and the layer thickness wd15 of the outer layer 15 determined from the runtime measurement results the outer radius R16 of the foam layer 16 as R16=R15−wd15.

Subsequently, the cross-sectional surface A, indicated in FIG. 3, may be determined from the length mass Lg and the density ρ116 of the continuous plastic material of the entire ring-shaped layer 116 by formation of quotients as:

$$A=Lg/\rho \quad (GL5)$$

Thus, the cross-sectional surface A and also the outer radius R16 of the ring-shaped foam layer 16 is known. The following applies $$A \approx \Pi*R16*wd116 \quad (GL6)$$

Thus, from this wd116 is determined.
Therefore, from $$wd16=wd116+wd216 \quad (GL7)$$

and Gl 2 follows:

$$n_{16} = \frac{t_{16}*c}{2*wd_{16}} = \frac{t_{16}*c}{2*wd_{116}(1-n_{116})+t_{16}*c} \quad (GL8)$$

Using equation GL2 the wall thickness wd16 of the foam layer 16 may be calculated or determined respectively from the refraction index n16.

Thus, the refraction index n16 of the foam layer 16 may be viewed as a material specific property of the foam layer 16 and may serve directly for regulating the feed-in rate z. Thus, the refraction index n16 can be compared to a refraction index nsoll. Hereby, it becomes apparent that already the refraction index n16 represents a good comparison value for adjustments of the feed-in rate z.

Thus, a regulation and therewith a method for manufacturing an extrusion product 2 can be created, where a regulation of the material feed and therewith a generation of extrusion products like the foam pipe 2 with high quality is possible by means of determining the refraction index n16 of the foam layer 16 and thereafter by the controller 12 by putting out amount related adjustment signals S3 to the conveyor device 6.

Instead of the refraction index n16 of the foam layer 16 it is also possible to determine another material specific variable, e.g. a foaming degree sg, which is determined as volume related portion of the plastics material in the foam layer 16. Thus, this relative value also corresponds to the relative surface value of the fictitious material layer 216 in the layer 16.

Even pure foam pipe, i.e. a foam layer 16 alone without the further layers 15 and 17, can be manufacture accordingly. In such a case the outer diameter D16=2×R16 may be determined directly electro-magnetically or optically or even from knowledge of the outer diameter of the nozzle 3c.

When manufacturing plane, i.e. non-round, products a Terahertz measuring device may be chosen accordingly radiating directly at a right angle onto the extrusion product 2.

Thus, according to FIG. 6, the method according to the invention comprises the following steps: after the start in step St0, subsequently, in step St1, the signals are received, i.e. the first measuring signal S1 of the feed-in volume z (feed-in value measuring signal), the second measuring signal S2 of the electro-magnetic measurement, i.e. the runtimes t16, t15, t17, the third measuring signal S3 of the extraction velocity v. If applicable, the controller 12 can receive further measuring signal here, e.g. of the extruder 3. Furthermore, the controller 12 resorts to known material specific data and equations of an internal or external memory 13.

Subsequently, thus, the controller 12 determines the refraction index n16 of the foam layer 16 according to the afore-mentioned equations in step St2 and compares e.g. to a target value nsoll; if appropriate, also a degree of foaming or the wall thickness wd16 of the foam layer 16 is determined.

Then, in the subsequent regulation step St3 volume adjustment signals S3 are determined and put out to the conveyor device 6, whereupon the method is reset again to a position prior to step St1.

Instead of gas or air respectively as the second substance of the mixed layer it is also possible to use e.g. a fiber material with known refraction index (instead n0=1) or another mixture of two substances.

The invention claimed is:

1. A method for determining at least one layer property of a layer to be determined regarding at least one property thereof in an extrusion process, whereby a supply material is mixed or superimposed at least in part and an extrusion, product with the layer to be determined is output, the method comprising at least the following steps:
   a) irradiation of the extrusion product using electro-magnetic radiation;
   b) electro-magnetic measuring of at least one radiation having travelled through the layer to be determined;
   c) carrying out a reflection measurement on at least one boundary layer of the extrusion product;
   d) measuring at least one feed-in rate and/or feed-in volume of the supply material;
   e) determining at least one layer property of the layer to be determined from the measured at least one feed-in rate and/or feed-in volume and the electro-magnetic measurement; and
   f) in the extrusion process the extrusion product is made of a plastics material and the at least one layer to be determined is made of mixed plastics comprising at least two substances.

2. The method according to claim 1, wherein:
   a) as the layer to be determined, a foam layer is investigated which is made from a plastics material with a gas during the extrusion.

3. The method according to claim 1, wherein:
   the extrusion product is measured electro-magnetically during the conveyance involving relative adjustment of the extrusion product in its direction of conveyance.

4. The method according to claim 1, in:
   a) further, a retraction velocity of the extrusion product is determined and used for determining the at least one layer property.

5. The method according to claim 4, wherein:
   a) from the retraction velocity and the feed-in rate a cross-section surface of the layer to be determined and/or fictitious partial material layer of the layer to be determined a layer mixed from two substances layer is determined.

6. The method according to claim 5, wherein:
   a) the mixed layer with its layer thickness is determined as the sum or superimposition of a fictitious continuous material layer of a first plastics component with a first partial wall thickness and a fictitious second layer, e.g. gas layer, with a second partial wall thickness, whereby the two partial wall thicknesses together form the wall thickness of the mixed layer.

7. The method according to claim 1, wherein:
   a) upon determining the layer property, further, at least one dimension of the extrusion product or of a layer of the extrusion product is included.

8. The method according to claim 3, wherein:
   the extrusion product is measured electro-magnetically during the conveyance involving relative adjustment of the extrusion product is its direction of conveyance, and without rotation of the extrusion product.

9. The method according to claim 7, wherein:
   a) the at least one dimension includes a diameter of the extrusion product.

10. A method for determining at least one layer property of a layer to be determined regarding at least one property thereof in an extrusion process, whereby a supply material is mixed or superimposed at least in part and an extrusion product with the layer to be determined is output, the method comprising at least the following steps:
    a) irradiation of the extrusion product using electro-magnetic radiation;
    b) electro-magnetic measuring of at least one radiation having travelled through the layer to be determined;
    c) carrying out a reflection measurement on at least one boundary layer of the extrusion product;
    d) measuring at least one feed-in rate and/or feed-in volume of the supply material; and
    e) determining at least one layer property of the layer to be determined from the measured at least one feed-in rate and/or feed-in volume and the electro-magnetic measurement; and
    f) the electro-magnetic radiation is Terahertz radiation in a frequency range between 0.01 and 50 THz.

11. The method according to claim 10, wherein:
    a) a runtime measurement determining at least one runtime of the Terahertz radiation in at least one layer of the extrusion product is carried out.

12. A method for determining at least one layer property of a layer to be determined regarding at least one property thereof in an extrusion process, whereby a supply material is mixed or superimposed at least in part and an extrusion product with the layer to be determined is output, the method comprising at least the following steps:
  a) irradiation of the extrusion product using electro-magnetic radiation;
  h) electro-magnetic measuring of at least one radiation having travelled through the layer to be determined;
  c) carrying out a reflection measurement on at least one boundary layer of the extrusion product;
  d) measuring at least one feed-in rate and/or feed-in volume of the supply material; and
  e) determining at least one layer property of the layer to be determined from the measured at least one feed-in rate and/or feed-in volume and the electro-magnetic measurement; and
  f) the feed-in rate is measured gravimetrically and/or involving measurement of a supply mass per time and/or involving measurement of a supply volume per time.

13. The method according to claim 12, wherein:
  a) the feed-in rate involves measurement of the supply mass per time by means of a scales device.

14. A method for determining at least one layer property of a layer to be determined regarding at least one property thereof in an extrusion process, whereby a supply material is mixed or superimposed at least in part and an extrusion product with the layer to be determined is output, the method comprising at least the following steps:
  a) irradiation of the extrusion product using electro-magnetic radiation;
  g) electro-magnetic measuring of at least one radiation having travelled through the layer to be determined;
  c) carrying out a reflection measurement on at least one boundary layer of the extrusion product;
  d) measuring at least one feed-in rate and/or feed-in volume of the supply material; and
  e) determining at least one layer property off the layer to be determined from the measured at least one feed-in rate and/or feed-in volume and the electro-magnetic measurement; and
  f) as layer property of the mixed layer, a refraction index and a wall thickness is determined.

* * * * *